UNITED STATES PATENT OFFICE.

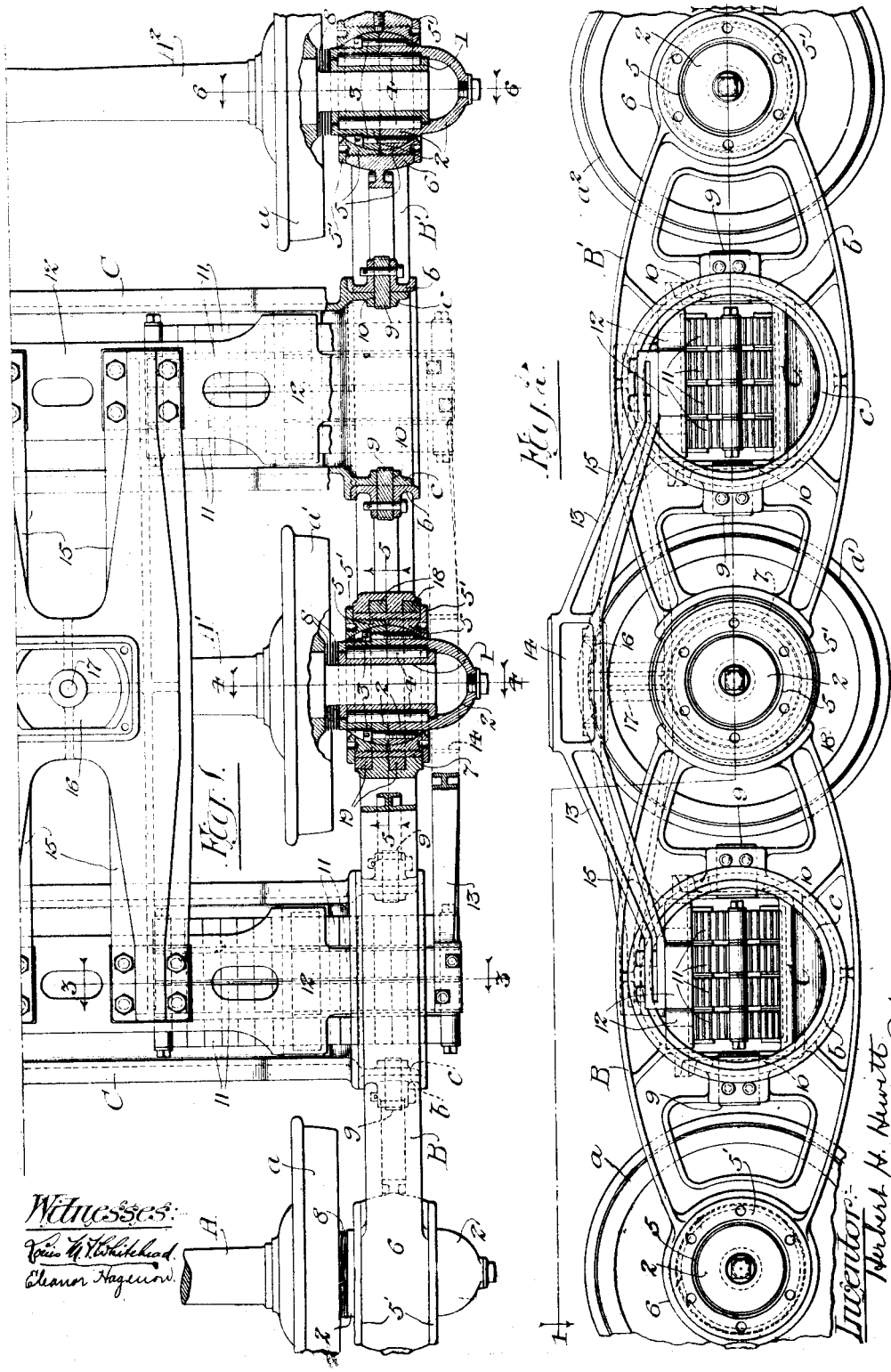

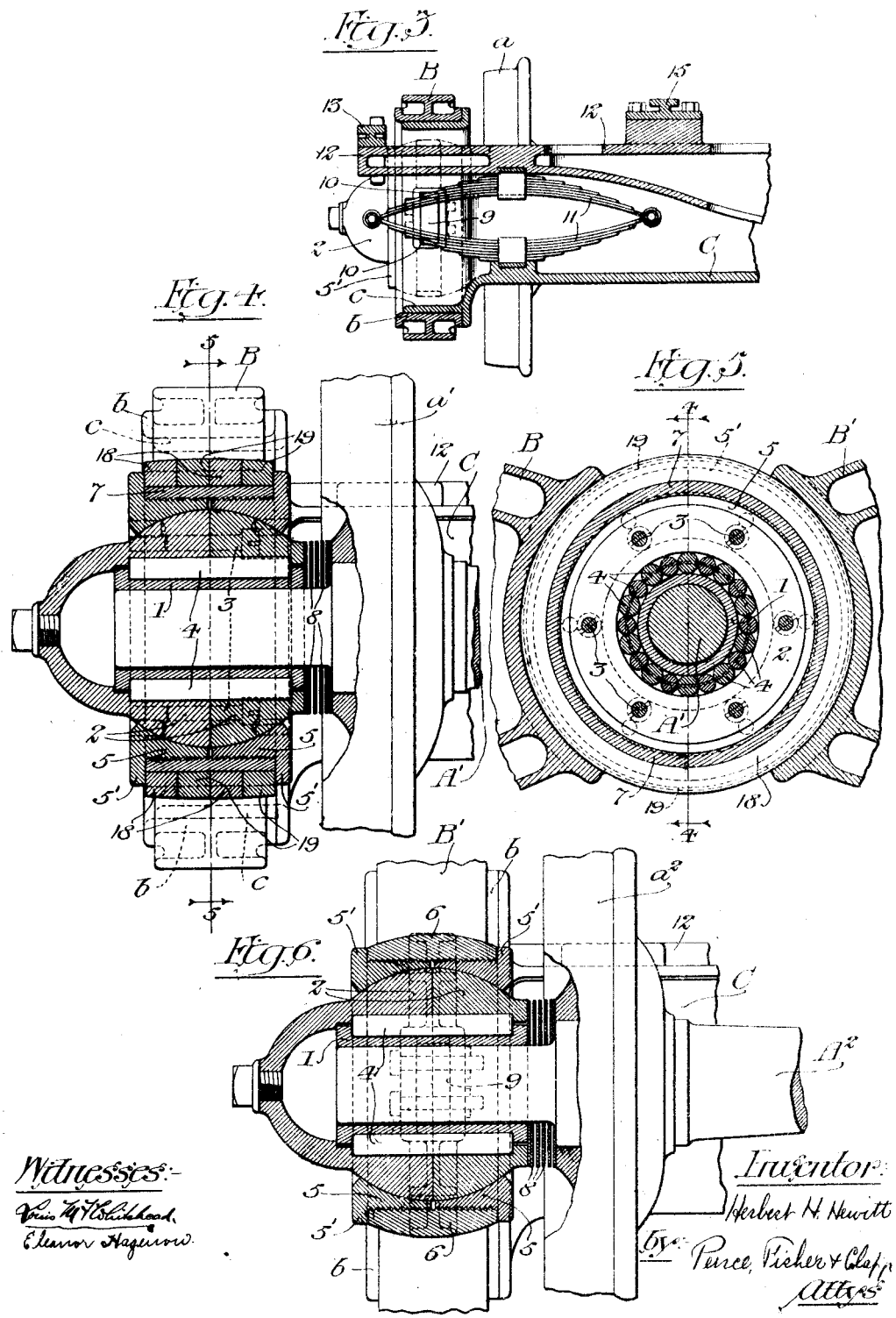

HERBERT H. HEWITT, OF BUFFALO, NEW YORK.

CAR-TRUCK.

1,072,724.　　　　Specification of Letters Patent.　　Patented Sept. 9, 1913.

Application filed January 18, 1912. Serial No. 671,306.

*To all whom it may concern:*

Be it known that I, HERBERT H. HEWITT, a citizen of the United States, and a resident of Buffalo, county of Erie, State of New York, have invented certain new and useful Improvements in Car-Trucks, of which I do declare the following to be a full, clear, and exact description, reference being had to the accompanying drawings, forming part of this specification.

In Letters Patent No. 1,009,747, granted to me November 28, 1911, there is set forth a construction of truck for railway cars in which the opposite side frames of the truck are rotatably connected to the transverse members of the truck and in which the wheel axles have their ends pivotally connected with the side frames in manner permitting said axles to rock in planes substantially transverse to the planes of the side frames. In my aforesaid Letters Patent the invention is shown as applied to a four-wheel truck, that is to say, a truck in which each of the side frames is provided at its ends with journal boxes, the two axles of the truck being pivotally mounted in such journal boxes.

The main object of my present invention is to provide means whereby the advantageous features of my hereinbefore mentioned patent may be applied in connection with "six-wheel car trucks" or trucks having more than two axles.

The invention consists in the features of novelty hereinafter described, illustrated in the accompanying drawings and particularly pointed out in the claims at the end of this specification.

Figure 1 is a plan view (parts being shown in section on line 1—1 of Fig. 2) of so much of a six-wheel car truck as is necessary to disclose the embodiment of my invention. Fig. 2 is a view of my improved truck in side elevation. Fig. 3 is a view in vertical section on line 3—3 of Fig. 1. Fig. 4 is a view in vertical section on line 4—4 of Figs. 1 and 5, this view being upon an enlarged scale. Fig. 5 is a view in vertical section on line 5—5 of Fig. 4. Fig. 6 is a view in vertical section upon an enlarged scale, on line 6—6 of Fig. 1.

In the accompanying drawings, A, A' and A² designate the several car axles and $a$, $a'$ and $a^2$ denote the wheels connected to said axles. The journals of the front and rear axles A and A² will be connected to the side frames of the truck in such manner that the axles may move at right angles or transverse to the plane of the side frames, as in the car truck set forth in my hereinbefore mentioned Letters Patent, No. 1,009,747. Journal bearings for the axles may be of other suitable constructions than that shown. Each of these journal bearings comprises a sleeve 1 surrounding the journal of the axle, this sleeve having peripheral flanges at its ends and around this sleeve sets the oil box 2 which is shown as formed of sections bolted together, as at 3. Bearing rollers 4 are interposed between the sleeve 1 and the oil box 2, these rollers being held against endwise movement by the flanges of the sleeve and oil box. The periphery of the oil box is of spherical shape, but set within the correspondingly spherical cavity of the keeper rings 5. The keeper rings for the journal boxes of the outer axles A and A² are screwed into annular threaded openings in the outer end portions 6 of the side frame members B and B'. The keepers for the journal boxes of the central or intermediate axle A' are threaded into a sleeve 7 which is carried by the inner ends of the side frame members. Between the hub of each car wheel and the sleeve 1 and the oil box 2 adjacent thereto is placed a flat coiled spring 8 that serves not merely to cushion the lateral shocks, but also to prevent the leakage of oil from the oil box.

The six wheel truck shown in the accompanying drawings has sectional side frames each formed of two members B and B' that are pivotally connected together about the journal of the center or intermediate axle A'. The opposite side frame sections or members are flexibly connected and preferably each of these members is flexibly or rotatably connected to the transverse means or member (a truck transom, for example,) whereby the side frame members are connected together. The purpose of thus connecting the side frame members to the transverse member or transom of the truck is fully set forth in my hereinbefore mentioned Letters Patent No. 1,009,747. Manifestly, however, if the truck comprised two transverse members or transoms each united to a rigid or integral side frame, the advantages of rotatably connecting the side frame to the ends of the transom would not be attained. Hence, in the construction herein set forth I have formed each side frame of a plurality of members or sections that are flexibly connected with respect to the center axle of the truck, so that in a six wheel truck the side frames may rock upon the ends of the transverse members in order to give to the truck a great degree of flexibility which will enable it to effectively withstand the shocks and strains incident to inequalities of the track or road-bed over which it travels.

The members or side frame sections B, B' may be varied as to their construction within wide limits without departing from the spirit of the present invention and the manner of connecting these sections together and to the transoms or traverse members of the truck may also be varied within wide limits. As shown, each member B, B' is formed with a central opening, the annular surrounding portion $b$ of which is adapted to receive the circular end portion $c$ of the transom C. The portion $b$ is chambered to receive a connecting bolt 9 that passes into a slot 10 formed in the annular end portion $c$ of the transom C, the slot being slightly longer than the height of the bolt 9 in order to permit the rotation of the side frame with respect to the transom.

Within the ends of the transoms C, which are shown as of U-shaped construction, are placed springs 11 which support truck bolsters 12 within the upper portions of the U-shaped transoms. The ends of the bolsters 12 project through the open circular portions $c$ of the transoms and are bolted to the ends of a yoke 13 the central portion 14 of which carries the side bearing of the truck. To the central portions of the bolsters 12 are connected the arms 15 of the equalizing frame or yoke 16, the center of which is formed with an opening 17 to receive the usual king pin of the truck. From this construction it will be seen that the weight of the car will be distributed to the two bolsters 12 of the truck.

The manner in which I prefer to pivotally connect the members of the side frame sections B, B' is as shown in the accompanying drawings. That is to say, the inner end of the side frame section or member B is formed with two rings 18, and the inner end of the side frame section or member B' is formed with two rings 19 adapted to mesh with or fit between the rings 18 when the side frame sections are placed together for use, as shown in the drawings. The rings 18 and 19 extend around the oil box of the intermediate axle A' and fit upon the interiorly threaded sleeve 7. The keeper rings 6 are threaded into the opposite ends of the sleeve 7 and the flanges 5' of the keepers not only overlap the ends of the sleeve 7, but also overlap the rings 18 and 19 of the side frame sections to hold the parts together.

From the foregoing description it will be seen that when the parts are assembled, as shown in the drawings, the side frame members or sections B and B' will be securely interlocked by the engagement of rings 18 and 19 thereof with the sleeve 7, and each will be free to pivot about the sleeve that passes through these rings. Hence, it will be seen that when any one of the wheels reaches an obstruction or depression in the track, the side frame sections are free to rock and thereby relieve the truck from strains or shocks incident to the passage of the wheels over such obstruction or depression.

While I have described what I regard as the preferred embodiment of my invention, I wish it distinctly understood that the precise details above set out may be varied without departing from the broad scope of the invention and that features of the invention may be employed without its adoption as an entirety.

I claim as my invention:—

1. A car truck comprising three or more wheel axles, sectional side frames, means separate from said wheel axles for flexibly connecting the adjacent ends of said side frames, and members extending across the truck and flexibly connected to the opposite side frame sections to permit the rocking movement of said sections.

2. A car truck comprising three or more wheel axles, sectional side frames, means separate from said wheel axles for pivotally connecting the adjacent ends of said side frame sections, members extending across the truck and pivotally connected to the opposite side frame sections to permit the rocking movement of the latter, and journal boxes for the wheel axles mounted at the ends of said side frame sections.

3. A car truck comprising sectional side frames, three or more wheel axles journaled at the ends of the sections of said side frames, pivotal connections between the adjacent ends of said sections, said pivotal connections being separate from, but coaxial with the journals of the intermediate axle or axles and transverse members flexibly connecting said side frame members.

4. A car truck having three or more wheel axles and comprising side frame sections, and journal boxes for said wheel axles mounted at the ends of said side frame sections, said side frame sections having overlapping, pivotally connected inner ends extending about the journal boxes of the intermediate axle or axles.

5. A car truck having three or more wheel axles and comprising sectional side frames, means separate from the intermediate axle or axles for flexibly connecting the adjacent ends of said side frame sections, members extending across the truck and flexibly connected to the central portions of said side frame sections, and journal boxes for said wheel axles mounted at the ends of said side frame sections.

6. A car truck having three or more wheel axles and comprising sectional side frames, the sections of said side frames having transverse bearing openings, connecting members extending across the truck and having cylindrical end portions journaled in the bearing openings of said side frame sections, three or more wheel axles journaled at the ends of said side frame sections and pivotal connections between the adjacent ends of said side frame sections separate from but co-axial with the intermediate axle or axles.

7. A car truck comprising sectional side frames the members whereof are pivotally connected at their inner ends, transoms having cylindrical ends journaled in central openings in said side frame members, three or more wheel axles, and journal boxes therefor mounted in the ends of said side frame members, the journal boxes for the intermediate axle or axles being mounted within the pivotal connections between said members.

8. A car truck comprising sectional side frames, the members whereof are flexibly connected at their inner ends, transverse members flexibly connecting said side frame members, and three or more wheel axles journaled at the ends of said side frame members in a manner permitting the rocking movement of said axles in vertical transverse planes.

9. A car truck comprising sectional side frames, the members whereof are pivotally connected at their inner ends, transverse members pivotally connected to said side frame members to permit the rocking movement of the latter, three or more wheel axles, and journal boxes shiftably mounted at the ends of said side frame members in manner permitting the transverse rocking movement of said wheel axles.

10. A car truck comprising sectional side frames, the members whereof are flexibly connected at their adjacent ends, transverse members flexibly connecting said side frame members to permit the rocking movement of the latter, three or more wheel axles and journal boxes therefor mounted to shift universally upon the ends of said side frame members.

11. A car truck comprising sectional side frames, transverse members flexibly connecting the members of said sectional side frames, three or more wheel axles, and journal boxes therefor shiftably mounted at the ends of said side frame members, the latter being pivotally connected about the journal boxes of the intermediate axle or axles.

12. A car truck comprising sectional side frames, the members whereof are pivotally connected at their adjacent ends, transverse members pivotally connected to the side frame members, three or more wheel axles, and spherical bearing boxes for said axles mounted in correspondingly shaped seats at the ends of said side frame members.

13. A car truck comprising sectional side frames, sleeves forming pivotal connections between the adjacent ends of the members of said sectional side frames, three or more wheel axles and journal boxes therefor movably mounted within the seats in the outer ends of said side frame members and in said sleeves.

14. A car truck comprising sectional side frames, sleeves forming pivotal connections between the adjacent ends of the members of said sectional side frames, three or more wheel axles, spherical journal boxes for said wheel axles, and spherical concave keepers for said boxes mounted within said sleeves and within openings in the ends of said side frame members.

15. A car truck comprising sectional side frames the members whereof are pivotally connected at their adjacent ends, three wheel axles journaled at the ends of said side frame members, spring supported bolsters extending between said side frame members, the latter being free to rock relatively to said bolsters, and an equalizing yoke mounted on said bolsters.

16. A car truck comprising sectional side frames, the sections of each of said side frames being flexibly connected at their adjacent ends, three wheel axles journaled at the ends of said side frame sections, spring supported truck bolsters extending between the opposite side frame sections, the latter being free to rock relatively to said bolsters and center and side bearing yokes mounted on said bolsters.

17. A car truck comprising sectional side frames, the members of each of said side frames having overlapping, pivotally connected inner ends, transverse members connecting said side frame members, three or more wheel axles and journal boxes for said wheel axles pivotally mounted at the ends of said side frame members to permit the transverse rocking movement of said wheel axles.

18. A car truck comprising sectional side frames, the members of each of said side frames having overlapping rings at their inner ends, the pivot sleeves extending through said rings, three or more wheel axles and journal boxes for said wheel axles mounted on the outer ends of said side frame members and in said sleeves.

19. A car truck comprising sectional side frames, the members of each of said side frames having overlapping rings at their inner ends, pivot sleeves extending through and interlocking said rings, transverse members flexibly connecting said side frame members, three or more wheel axles and journal boxes for said wheel axles pivotally mounted upon the outer end of said side frame members and in said sleeves to permit the transverse rocking movement of said wheel axles.

20. A car truck comprising sectional side frames, the members of each of said side frames having enlarged central portions provided with transverse bearing openings and having overlapping, pivotally connected inner ends, transverse members having large cylindrical end portions journaled within the central bearing openings of said side frame members, three or more wheel axles and journal boxes for said wheel axles held against relative vertical movement on the ends of said side frame members.

21. A car truck comprising sectional side frames, the sections of each of said side frames being flexibly connected at their adjacent ends, members extending across the truck and flexibly connected at their ends to the opposite side frame sections in manner permitting the vertical rocking of the latter, three or more wheel axles and journal boxes having bearings for the journals of said wheel axles, said journal boxes being pivotally mounted at the ends of said side frame sections to rock in transverse planes with said wheel axles.

22. A car truck comprising sectional side frames, the sections of each of said side frames having central bearing openings and being flexibly connected at their adjacent ends, transverse members having end journals engaging the bearing openings of said side frame sections to permit the vertical rocking movement of the latter, three or more wheel axles and journal boxes having bearings for the journals of said wheel axles pivotally mounted at the ends of said side frame sections to rock in transverse planes with said wheel axles.

23. A car truck comprising sectional side frames, the sections of each of said side frames having transverse bearing openings, transverse connecting members having cylindrical end portions engaging the bearing openings of said side frames to permit the vertical rocking movement of the latter, three or more wheel axles and journal boxes having bearings, the journals of said wheel axles pivotally mounted at the ends of said side frame sections to permit the transverse rocking movement of said wheel axles, the sections of each of said side frames having overlapping, pivotally connected adjacent ends extending about the journal boxes of the intermediate axle or axles.

24. A car truck comprising sectional side frames, the sections of each of said side frames having transverse bearing openings, and having overlapping, pivotally connected adjacent ends, truck transoms having end journals engaging the bearing openings of said side frame sections, spring supported bolsters carried by said truck transoms and a yoke for supporting the car body mounted on and extending between said bolsters.

25. A truck transom comprising side frames each formed of two sections, the sections of each of said side frames having central bearing openings, connecting members extending across the truck and having end journals engaging the central bearing openings of said side frame sections, three wheel axles, journal boxes for said wheel axles mounted at the ends of said side frame sections, and flexible connections between the adjacent ends of the sections of each of said side frames, said connections being separate from said wheel axles.

HERBERT H. HEWITT.

Witnesses:
 ELEANOR HAGENOW,
 KATHARINE GERLACH.